Sept. 22, 1964  J. F. NORTON  3,149,641
SLIDE VALVE
Filed April 6, 1961  2 Sheets-Sheet 1
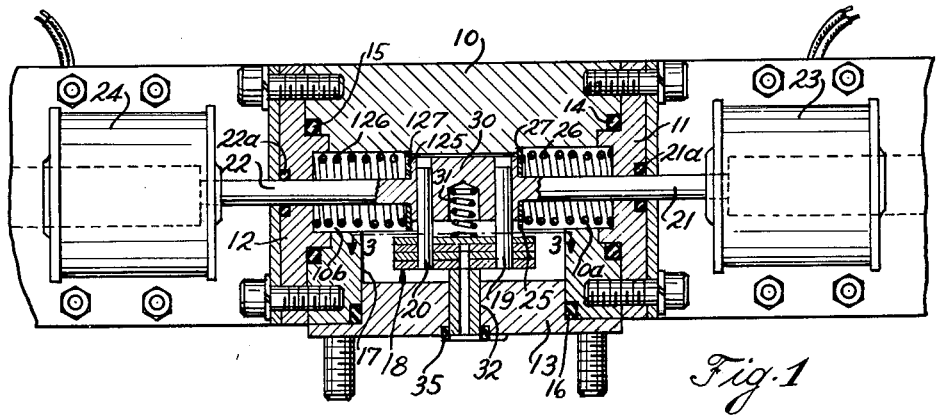
INVENTOR.
JAMES FREDERICK NORTON
BY
RICHEY, MCNENNY & FARRINGTON
William J. F. Flynn
ATTORNEYS

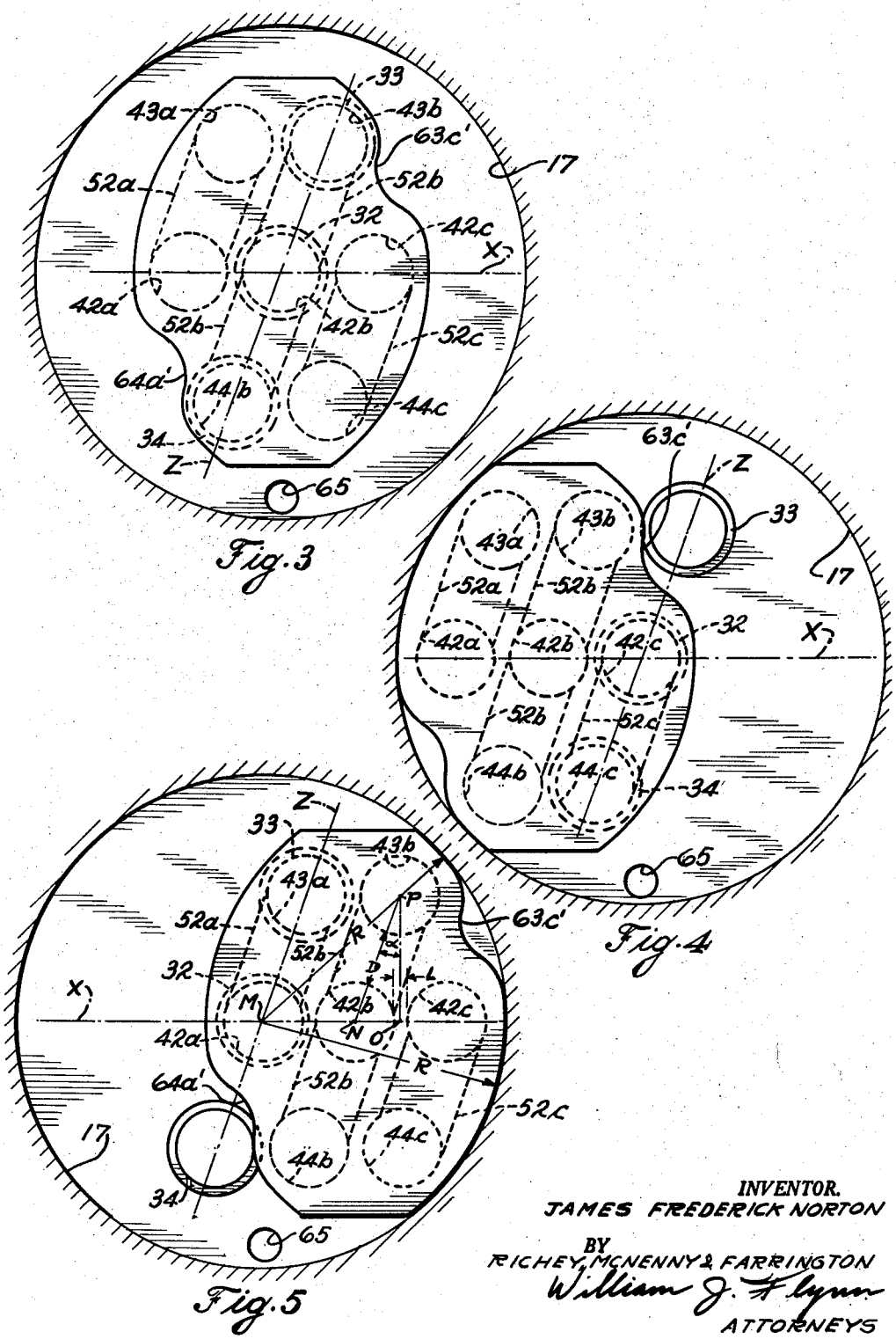

United States Patent Office 3,149,641
Patented Sept. 22, 1964

3,149,641
SLIDE VALVE
James Frederick Norton, Cleveland, Ohio, assignor to The Weatherhead Company, Cleveland, Ohio, a corporation of Ohio
Filed Apr. 6, 1961, Ser. No. 101,257
7 Claims. (Cl. 137—625.65)

This invention relates to a slide valve of the type in which a ported valve member is slidable selectively with respect to a plurality of valve seats for establishing different flow paths through the valve.

Prior to the present invention, various valves of this general type have been proposed in which the valve seats are disposed on opposite sides of the ported valve member and are fluid pressure-loaded or spring-loaded, or both, against the respective adjacent faces of the ported valve member. Such prior valves were unduly large in size and complex construction and, therefore, difficult and expensive to manufacture.

The present invention is directed to a novel and improved slide valve which is free of these disadvantages.

In accordance with the present invention, all of the valve seats are located on one side of the ported, slidable valve member, so that they are all slidably contacted by a single flat face of the slidable valve member. All of the valve seats are fixedly positioned and they provide rigid face seals against this face of the slidable valve member. The slidable valve member itself is pressure-loaded and spring-loaded against the rigid valve seats. However, the slidable valve member is subjected to a fluid pressure differential only at the relatively small area valve seats, so that excessive force is not required to slide the slidable valve member across the valve seats from one valving position to another. Also, the fixed valve seats are so positioned, and the ports and passages in the slidable valve member are so arranged, that a shorter travel of the slidable valve member is involved in shifting from one operative position to another and the entire valve may have a smaller housing.

It is an object of this invention to provide a novel and improved slide valve.

It is also an object of this invention to provide an improved slide valve having a novel construction which reduces the force required to shift the slidable valve member from one valving position to another.

Another object of this invention is to provide a novel and improved slide valve having a short stroke for shifting from one valving position to another.

Another object of this invention is to provide a novel and improved slide valve of reduced size.

Another object of this invention is to provide such a valve which is less complicated in construction and is less expensive to manufacture.

Another object of this invention is to provide a novel and improved slide valve which has substantially no leakage.

Further objects and advantages of this invention will be apparent from the following detailed description of a presently-preferred embodiment thereof, which is shown in the accompanying drawings.

In the drawings:

FIGURE 1 is a view partly in front elevation and partly in axial section, showing a preferred embodiment of the present valve;

FIGURE 2 is an exploded perspective view of the slidable valve member and the valve seats in the FIG. 1 valve;

FIGURE 3 is a view taken from the line 3—3 in FIG. 1 and showing the position of the slidable valve member with respect to the fixed valve seats in the neutral position of the slidable valve member;

FIGURE 4 is a view similar to FIG. 3 and showing the relationship of these parts when the slidable valve member is shifted to the left in FIG. 1; and FIGURE 5 is a view similar to FIG. 3 and showing the relationship of these parts when the slidable valve member is shifted to the right in FIG. 1.

Referring first to FIG. 1, the preferred embodiment of the present valve comprises a housing or body member 10 having a top wall and an integral depending annular side wall. At diametrically opposite sides the side wall of this housing is formed with aligned openings 10a and 10b which are closed by flanged end plates 11 and 12. At the bottom in FIG. 1 the housing member 10 is closed by a flanged cover plate 13. Suitable O-ring seals 14, 15 and 16 are provided between the valve housing member 10 and the end plates 11 and 12 and cover plate 13, respectively to prevent any leakage of fluid between these parts. The housing member 10 and the plates 11–13 together define a fluid-tight enclosure surrounding a valve chamber 17.

The slidable valve member, which is designated in its entirety by the reference numeral 18 in FIG. 1, is positioned in this valve chamber 17. A pair of drive pins 19 and 20 are suitably connected to the slidable valve member 18, extending vertically upward therefrom in FIG. 1. In one practical embodiment these drive pins are press fitted in vertical openings in the slidable valve member 18 and are brazed in place.

The drive pins are arranged to be actuated by an actuating shaft 30 which is reciprocable horizontally in FIG. 1. As shown in FIG. 1, this shaft is formed with vertical openings which snugly receive the drive pins 19 and 20. On opposite sides the actuating shaft has reduced extensions 21 and 22, which extend slidably through the end plates 11 and 12 of the housing. The valve chamber 17 is sealed by suitable O-ring seals 21a and 22a at these shaft extensions. These extensions are arranged to be operated by respective solenoids 23 and 24 in a conventional manner.

A rigid, flat, annular washer 25 extends loosely around the shaft extension 21 at the latter's connection to the main portion of actuating shaft 30. A coil spring 26 extending around this shaft extension is engaged under compression between washer 25 and the housing plate 11. The housing member 10 presents an internal shoulder 27 which is positioned to be engaged by the washer 25 so as to limit the extent to which the spring 26 can bias the actuating shaft 30 to the left in FIG. 1.

At the opposite side a similar arrangement of a washer 125 and compression spring 126 is provided. The spring biases washer 125 against an internal shoulder 127 on the housing member 10.

The respective compression springs normally center the slidable valve member 18 in the neutral position shown in FIG. 1 and in FIG. 3.

A coil spring 31 is engaged under compression between the main portion 30 of the actuating shaft and the top of the slidable valve member 18, and serves to bias the slidable valve member 18 downward in FIG. 1.

As best seen in FIG. 2, the cover plate 13 carries a plurality of fixed valve seat members here shown as three in number, although a greater or smaller number may be provided, as desired. These valve seat members are designated by the reference numerals 32, 33 and 34 in FIG. 2. As best seen in FIG. 1, the central valve seat member 32 is in the form of a cylindrical, rigid, metal sleeve which is press fitted in an opening in the cover plate 13, having its lower end face flush with the outside face of the cover plate. The upper end of the valve seat member 32 projects well above the inside face of the cover plate 13 and into the valve chamber 17, as shown clearly in FIGS. 1 and 2. The outer face of the cover plate 13 is formed with a counterbore which receives a sealing ring 35, such as a rubber O-ring, extending snugly around the lower end of the valve seat member 32.

The other valve seat members 33 and 34 are mounted in the cover plate 13 in the same manner. With this arrangement, the outer face of the cover plate 13 may be mounted in fluid tight fashion on a sub-plate or a mating valve (not shown) which may be associated with the valve of the present invention.

After the valve seat members 32, 33, 34 have been mounted in the cover plate 13, their exposed upper ends are simultaneously lapped flat to provide co-planar annular seats which are sealingly engaged by the flat bottom face of the slidable valve member 18.

As best seen in FIG. 1, the slidable valve member 18 is composed of a plurality of flat plates of identical size and external shape, which are assembled in contiguous relationship, one above the other. Preferably, these plates are copper brazed together to provide an integral unit.

In FIGS. 2–5 the openings in these plates for the drive pins 19 and 20 are omitted for the sake of clarity.

Referring to FIG. 2, the lowermost plate 40 of slidable valve member 18 is formed with a middle row of three equally spaced ports 42a, 42b and 42c. These ports are adapted to register individually and selectively with the passage through valve seat 32.

Plate 40 also has, at one side of the middle row of ports 42a, 42b and 42c, a row of two spaced ports 43a and 43b and a corner recess 43c', which are adapted to register individually and selectively with the passage through valve seat 33. The spacing between ports 43a and 43b and between port 43b and corner recess 43c' is the same as the spacing between successive ports 42a, 42b and 42c in the middle row.

Plate 40 also has, at the opposite side of the middle row of ports 42a, 42b and 42c, a corner recess 44a' and a row of two spaced ports 44b and 44c, which are adapted to register individually and selectively with the passage through valve seat 34. The spacing between corner recess 44a' and port 44b and between ports 44b and 44c is the same as the spacing between successive ports 42a, 42b and 42c in the middle row.

In the normal, or neutral, position of the valve (FIG. 3), the ports 42b, 43b and 44b in its bottom plate 40 register with the passages at valve seats 32, 33 and 34, respectively.

When valve member 18 is shifted to the left (FIG. 4) from its neutral position, the ports 42c and 44c and the corner recess 43c' in its bottom plate 40 register with the passages at valve seats 32, 34 and 33, respectively.

When valve member 18 is shifted to the right (FIG. 5) from its neutral position, the ports 42a and 43a and the corner recess 44a' in its bottom plate 40 register, respectively, with the passages at valve seats 32, 33 and 34.

The slidable valve member 18 also includes a pair of overlapping identical plates 50 and 51, which overlie the bottom plate 40. These plates have a corner recess 54a', which registers with the corner recess 44a' in bottom plate 40. An elongated passage 52a in plates 50 and 51 communicates at its opposite ends with the ports 42a and 43a in the bottom plate. An elongated passage 52b communicates with ports 42b, 43b and 44b in bottom plate 40. Plates 50 and 51 also have a corner recess 53c' which registers with the corner recess 43c' in bottom plate 40. An elongated passage 52c in plates 50 and 51 communicates with ports 42c and 44c in the bottom plate.

The slidable valve member 18 also has a top plate 60 overlying plate 51 and having corner recesses 54a' and 63c', which register with the corner recesses 54a', 44a' and 53c', 43c', respectively.

The cover plate 13 is formed with a fluid pressure inlet passage 65 (FIG. 2) which is arranged to be connected to a suitable fluid pressure source. This passage terminates at the inside face of cover plate 13 and is unobstructed by the slidable valve member 18 at all times.

With this arrangement, fluid under pressure is introduced through the cover plate passage 65 into the valve chamber 17. In one practical embodiment, the passage through the central valve seat member 32 is arranged to be connected to an exhaust line, while the passages at the other valve seats 33 and 34 are arranged to be connected to different fluid pressure responsive devices.

FIGS. 3–5 show on an enlarged scale the shape of the slidable valve member 18, the arrangement of the ports and passages therein, and its relationship to the valve body chamber 17 and to the valve seats.

As shown in these figures, the chamber 17 in the valve body is cylindrical where the slidable valve member 18 operates. The cylindrical inner end of plate 13 is snugly received in this chamber. The axis of the passage through the central valve seat 32 coincides with the axis of chamber 17.

The axis of movement of valve member 18 is along the line X in FIGS. 2–5, extending diametrically across chamber 17.

The axes of the valve seats 32–34 are arranged along a straight line Z extending at an oblique angle to line X, for a purpose explained hereinafter.

As shown in FIG. 5, there is a clearance L between the ports 42b and 42c along the axis of movement X of slidable valve member 18. This clearance is the minimum required to provide an effective seal between these ports at the valve seat 32 with which they cooperate. The same clearance is provided between ports 43a and 43b, between ports 42a and 42b, and between ports 44b and 44c.

As shown in FIG. 5, except at the corner recess 63c', the right side edge of valve member is cylindrical about the axis of port 42a. The radius R of this cylinder is equal to the radius of the bore 17 in the valve body.

In like manner, the left side edge of valve member 18 is cylindrical about the axis of port 42c, except at corner recess 64a', with the same radius R as the valve body chamber 17.

The minimum distance between each of ports 43a, 43b, 44c and 44b and the corresponding side edge of valve member 18 is the aforementioned clearance L. The minimum distance between the end ports 42a and 42c in the middle row and the adjacent side edges of valve member 18 is somewhat greater than the clearance L.

A clearance D (FIG. 5) is provided between ports 42b and 43b. This same clearance is provided between ports 43a and 42a, between ports 42b and 44b, and between ports 42c and 44c. This clearance is the minimum permitted by the radial thickness of each valve seat 32–34 and the corresponding O-ring 35 at the outside of the valve body.

In accordance with the present invention the ports 43b and 44c and the ports 43a and 44b are aligned with one another along lines running perpendicular to the axis of movement X of slidable valve member 18. The line joining the axes of ports 43b and 44c runs midway between the ports 42b and 42c in the middle row. Similarly, the line joining the axes of ports 43a and 44b runs midway between ports 42a and 42b in the middle row.

With this arrangement, the radius R required to provide a clearance L between the outer edge of each port 43b and 44c and the right side edge of valve member 18 is the same for both of these ports. This constitutes one of the conditions necessary for a minimum radius R of the valve chamber 17, and thus a minimum size of the valve housing.

The same condition applies for the corner ports 43a and 44b at the left hand side of valve member 18.

With this arrangement of the ports, the port 43b has the same clearance D from port 42c as from port 42b. This is also true of port 43a with respect to both 42b and 42a, of port 44b with respect to both 42a and 42b, and of port 44c with respect to both 42b and 42c.

The other conditions which determine this radius R are the size of the ports in valve member 18, the clearance L required between adjacent ports in each row and beyond each corner bore to the side edge of the valve member, the spacing D between correspondingly positioned ports in adjoining rows, and the angle between the lines Z and X.

The radius R can be computed as follows, referring to FIG. 5, $$R = \sqrt{(\overline{NP} \cos \alpha)^2 + (\overline{MN} + \overline{NO})^2} + r + L$$
$$= \sqrt{[(2r+D) \cos \alpha]^2 + [3r + 1\tfrac{1}{2}L]^2} + r + L$$

where $r$=radius of each hole in the valve member 18, M is the center of port 42a, N is the center of port 42b, O a point on axis X midway between ports 42b and 42c, P is the center of port 43b, and $\alpha$ is the angle between line Z and a line perpendicular to the axis of movement X of valve member 18.

In one practical embodiment, the angle $\alpha=20°$, which means that the ports in valve seats 32–34 are each arranged along a line Z at 70° to the axis of movement X of valve member 18. This angle may vary, to provide the minimum size of valve chamber 17, depending upon other factors, such as the clearances L and D and the size of the ports in valve member 18.

In the operation of this valve, when both solenoids 23 and 24 are de-energized the slidable valve member 18 is in the neutral position shown in FIGS. 1 and 3. In this position the passages at the valve seats 33 and 34 are both connected to the exhaust passage at valve seat 32 by way of the ports and passage 43b, 44b, 52b and 42b in the slidable valve member 18.

When the solenoid 24 is energized, it pulls the actuating shaft 30 and the slidable valve member 18 to the left in FIG. 1, to the position shown in FIG. 4. In this position the passage at valve seat 33 is open to the pressurized fluid in chamber 17. At the same time, the passage through valve seat 34 is connected to the exhaust passage at valve seat 32 by way of the ports and passage 44c, 52c and 42c in the slidable valve member 18. In this position of slidable valve member 18 its left side edge abuts against the left side wall of chamber 17 in valve body 10.

Alternatively, when the solenoid 23 is energized, it pulls the actuating shaft 30 and the slidable valve member 18 to the right in FIG. 1 to the position shown in FIG. 5. In this position the passage at valve seat 34 is open to the pressurized fluid in valve chamber 17. At the same time, the passage at valve seat 33 is connected to the exhaust passage at valve seat 32 by way of the openings and passage 43a, 52a and 42a in the slidable valve member 18. In this position of slidable valve member 18 its right side edge abuts against the right side wall of chamber 17 in valve body 10.

The pressure inlet passage 65 is open in all positions of slidable valve member 18.

From FIG. 1, it will be apparent that the slidable valve member 18 is subjected at its top and bottom to the fluid pressure in chamber 17. At its bottom face, the slidable valve member is exposed to this fluid pressure across its entire extent, except where it engages the valve seats 32, 33 and 34. At the top, the entire area of the slidable valve member is subjected to this fluid pressure. Therefore, the fluid pressure produces a downward force differential on the slidable valve member 18 which is equal to the fluid pressure in chamber 17 multiplied by the area across the valve seats. Added to this fluid differential force is the biasing force of spring 31. However, because the slidable valve member 18 is almost fully pressure balanced, top and bottom, the net differential force is relatively small, so that the friction which must be overcome to slide the valve member 18 across the valve seats from one valving position to another is not excessive.

Also, from FIG. 1 it will be apparent that the opposite ends of the slidable valve member 18 and the opposite ends of the main portion 30 of the actuating shaft have equal areas exposed to the fluid within chamber. Therefore, these members are hydraulically balanced in the direction in which they are shifted from one operative position to another. This also tends to minimize the operating force required to shift the valve member 18.

This low shifting force makes the valve suitable for operation by solenoids for small and medium sized valves. Larger valves would, of course, have greater friction to overcome and would require operating forces larger than are feasible, economically, using solenoids. For such valves, hydraulic pistons or other operating devices may be used in place of solenoids. Such pistons or other operating devices could in turn, be operated by a solenoid valve as shown in FIG. 1.

As already described in detail the arrangement of ports in the valving face of slidable valve member 18 and the positions of the ported valve seats, both with respect to the line of movement of the ported valve member in chamber 17, enables the chamber to be of a minimum size, thereby minimizing the overall size of the valve.

While a specific, presently-preferred embodiment of this invention has been described in detail and illustrated in the accompanying drawings, it is to be understood that various modifications, omissions and refinements which depart from the disclosed embodiment may be adopted without departing from the spirit and scope of this invention.

What is claimed is:

1. A valve comprising housing means defining a chamber for receiving fluid under pressure, means providing a fluid inlet port leading into said chamber, a plurality of spaced, fixedly positioned valve seat members projecting into said chamber, each having a fluid passage therethrough, said valve seat members presenting spaced rigid annular valve seats which extend co-planar with each other in said chamber, a sliding valve member in said chamber having a flat valving face which slidably engages said valve seats and having an opposite face remote from said valve seats, the combined areas of said valve seats being only a small fraction of the area of said valving face on said sliding valve member, said sliding valve member having ports in its valving face which register selectively with the passages in said valve seat members and having enclosed internal passages which interconnect its ports, said sliding valve member being exposed on both of said faces thereof to the fluid pressure in said chamber except when its valving face engages said valve seats, said sliding valve member in all positions thereof being spaced from said inlet port and permitting the flow of fluid under pressure into said chamber, and means for moving said sliding valve member slidably across said valve seats to selectively establish registration between certain of the ports in sliding valve member and passages in said valve seat members.

2. A valve comprising housing means defining a fluid chamber, a plurality of fixedly positioned tubular valve seat members extending through one wall of said chamber and terminating in rigid, flat, annular valve seats within said chamber which are defined by lapped coplanar surfaces, said valve seats being spaced inwardly from the inside of said wall of the chamber and being spaced apart from one another in one direction across the chamber, said one wall of the chamber having a fluid inlet passage extending therethrough which terminates at the inside of said wall in spaced relationship to each of said valve seats, a slidable valve member within said chamber having a flat valving face which sealingly engages said valve seats and having an opposite face remote from said valve seats, the valving face on said slidable valve member having an area substantially greater than the combined areas of said valve seats, said slidable valve member having a plurality of ports which are open at its valving face for registration selectively with the passages through said tubular members and having internal passages which interconnect certain of said ports, said slidable valve member being subjected to the fluid pressure within said chamber across the entire extent of said opposite face and across the entire extent of said valving face except at its engagement with said valve seats, and means for selectively moving said slidable valve member slidably across said valve seats in a direction oblique to said one direction to thereby effect registration between different ports in the slidable valve member and the passages through said tubular members.

3. A valve comprising a housing defining a fluid chamber, an inlet passage leading into said chamber, a slidable valve member in said chamber, means for moving said slidable valve member along a straight line path in said chamber, means defining a plurality of fixedly positioned, co-planar, rigid annular valve seats projecting into said chamber and passages at said valve seats, said valve seats being spaced apart along a line extending oblique to said straight line path of the slidable valve member, said slidable valve member having a flat valving face and an opposite face, said valving face sealingly engaging said valve seats and having a plurality of groups of separate ports therein, the ports in each group being spaced apart along a line extending transverse to said straight line path of the slidable valve member, the ports in each group being positioned for selective registration simultaneously with passages at the valve seats, said slidable valve member having separate enclosed internal passages therein which interconnect ports in each group, the combined areas of said valve seats being only a small fraction of the area of said valving face on the slidable valve member, said slidable valve member being subjected to the pressure in said fluid chamber across the entire area of said opposite face and across the entire area of said valving face except at its engagement with said valve seats.

4. A valve comprising housing means enclosing a fluid chamber, a plurality of fixedly positioned rigid tubular members extending through one wall of said chamber and terminating in flat annular valve seats within said chamber which are defined by lapped co-planar surfaces, said valve seats being spaced inwardly beyond the inside of said chamber wall and being spaced apart from one another along a straight line extending in one direction across said chamber, means defining a fluid inlet passage extending through said one chamber wall and terminating at the inside of said wall in spaced relation to said valve seats, a slidable valve member in said chamber having a flat valving face which sealingly engages said valve seats and having an opposite face disposed away from said valve seats, said valve member having a plurality of spaced groups of ports which are open at its valving face, each group of ports extending parallel to said one direction across said chamber and being positioned for the selective registration of its ports simultaneously with passages through said tubular members, said slidable valve member having internal passages which interconnect ports in each group, an actuating shaft in said chamber spaced from said slidable valve member at the opposite side thereof from said valve seats, a pair of drive pins connected to said slidable valve member and coupled to said actuating shaft, a spring engaged under compression between said actuating shaft and said opposite face of the slidable valve member and biasing the slidable valve member against said valve seats, said actuating shaft having reduced extensions which project beyond opposite ends of said chamber in a direction at an oblique angle to said one direction, a pair of solenoids outside said housing at said opposite ends thereof cooperable with the respective shaft extensions to move said actuating shaft in said oblique direction when one solenoid or the other is energized, and a pair of opposed centering springs within said chamber extending respectively around said shaft extensions and acting between said housing means and the actuating shaft to center the slidable valve member at a predetermined position transversely with respect to said valve seats, said slidable valve member being subjected to the fluid pressure in said chamber across the entire extent of said opposite face and across the entire extent of said valving face except at its engagement with the valve seats.

5. A valve comprising a valve body having a chamber with a cylindrical side wall, a ported valve member slidable in said chamber along a diametrical axis of the chamber, said ported valve member having a middle row of three ports including a middle port and a pair of opposite end ports spaced apart equally along said axis, three ported valve seats in said chamber spaced apart along a diametrical line extending at an oblique angle to said axis, the middle one of said valve seats being disposed on said axis and the other valve seats being disposed respectively on opposite sides of said axis, said ported valve member having at one side of said axis a row of two ports spaced apart along a line parallel to said axis, said two ports including a first port positioned to register with the valve seat port at said one side of said axis when said middle port in the middle row registers with the middle valve seat port and a second port positioned to register with the valve seat port at said one side of said axis when one of said end ports in the middle row registers with said middle valve seat port, said ported valve member having at the opposite side of said axis a row of two ports spaced apart along a line parallel to said axis, said last-mentioned two ports including a first port positioned to register with the valve seat port at said opposite side of said axis when the other of said end ports in the middle row registers with the middle valve seat port and a second port positioned to register with the valve seat port at said opposite side of said axis when said middle port in said middle row registers with the middle valve seat port.

6. A valve comprising a valve body having a chamber with a cylindrical side wall, a ported valve member slidable in said chamber along a diametrical axis of the chamber, said ported valve member having a middle row of three ports including a middle port and a pair of opposite end ports spaced apart equally along said axis, three ported valve seats in said chamber spaced apart along a diametrical line extending at an oblique angle to said axis, one of said valve seats being disposed on said axis and the other valve seats being disposed respectively on opposite sides of said axis, said ported valve member having at one side of said axis a row of two ports spaced apart along a line parallel to said axis, said two ports including a first port positioned to register with the valve seat port at said one side of said axis when said middle port in the middle row registers with the middle valve seat port and a second port positioned to register with the valve seat port at said one side of said axis when one of said end ports in the middle row registers with said middle valve seat port, said ported valve member having at the opposite side of said axis a row of two ports spaced apart along a line parallel to said axis, said last-mentioned two ports including a first port positioned to register with the valve seat port at said opposite side of said axis when the other of said end ports in the middle row registers with the middle valve seat port and a second port positioned to register with the valve seat port at said opposite side of said axis when said middle port in said middle row registers with the middle valve seat port, the axes of said first ports on the opposite sides of first-mentioned said axis being aligned with each other along a line running perpendicular to said first-mentioned axis and passing midway between the middle port in the middle row and said other end port in the middle row, the side edge of the ported valve member adjacent each of said first ports lying on a cylinder whose axis is at the axis of said one end port in the middle row, the axes of said second ports on opposite sides of said first-mentioned axis being aligned with each other along a line running perpendicular to said first-mentioned axis and passing midway between the middle port in the middle row and said one end port in the middle row, the side edge of the ported valve member adjacent each of said second ports lying on a cylinder whose axis is at the axis of said other end port in the middle row, the radii of said side edge cylinders being equal to each other and equal to the radius of curvature of said cylindrical side wall of the chamber.

7. A valve comprising a valve body having a chamber with a cylindrical side wall, means defining a fluid inlet passage leading into said chamber, a ported valve member slidable in said chamber along a diametrical axis of the chamber, said ported valve member having a flat valving face with a middle row of three ports including a middle port and a pair of opposite end ports spaced apart equally along said axis, three ported valve seats in said chamber spaced apart along a diametrical line extending at an oblique angle to said axis, one of said valve seats being disposed on said axis and the other valve seats being disposed respectively on opposite sides of said axis, said ported valve member having in its valving face at one side of said axis a row of two ports spaced apart along a line parallel to said axis, said two ports including a first port positioned to register with the valve seat port at said one side of said axis when said middle port in the middle row registers with the middle valve seat port and a second port positioned to register with the valve seat port at said one side of said axis when one of said end ports in the middle row registers with said middle valve seat port, said ported valve member having at the opposite side of said axis a row of two ports spaced apart along a line parallel to said axis, said last-mentioned two ports including a first port positioned to register with the valve seat port at said opposite side of said axis when the other of said end ports in the middle row registers with the middle valve seat port and a second port positioned to register wtih the valve seat port at said opposite side of said axis when said middle port in said middle row registers with the middle valve seat port, the axes of said first ports on the opposite sides of said first-mentioned axis being aligned with each other along a line running perpendicular to said first-mentioned axis and passing midway between the middle port in the middle row and said other end port in the middle row, the side edge of the ported valve member adjacent each of said first ports lying on a cylinder whose axis is at the axis of said one end port in the middle row, the axes of said second ports on opposite sides of said first-mentioned axis being aligned with each other along a line running perpendicular to said first-mentioned axis and passing midway between the middle port in the middle row and said one end port in the middle row, the side edge of the ported valve member adjacent each of said second ports lying on a cylinder whose axis is at the axis of said other end port in the middle row, the radii of cylindrical curvature of said side edges being equal to each other and equal to the radius of curvature of said cylindrical side wall of the chamber, said flat valving face of the ported valve member being exposed to the fluid pressure in said chamber except at its engagement with said valve seats, said ported valve member having a flat face opposite the valving face, said opposite face being exposed throughout its entire extent to the fluid pressure in said chamber.

References Cited in the file of this patent
UNITED STATES PATENTS

| | | |
|---|---|---|
| 439,349 | Greene | Oct. 28, 1890 |
| 994,544 | Sutter | June 6, 1911 |
| 1,790,168 | Paul | Jan. 27, 1931 |
| 3,020,927 | McLaughlin | Feb. 13, 1962 |
| 3,023,784 | Monson | Mar. 6, 1962 |
| 3,045,702 | Nakata | July 24, 1962 |